A. BECHMANN.
EDUCATIONAL APPLIANCE.
APPLICATION FILED FEB. 18, 1915.
1,163,125.
Patented Dec. 7, 1915.
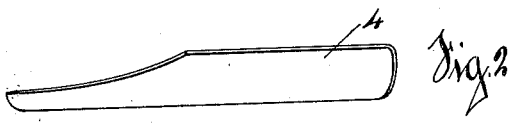
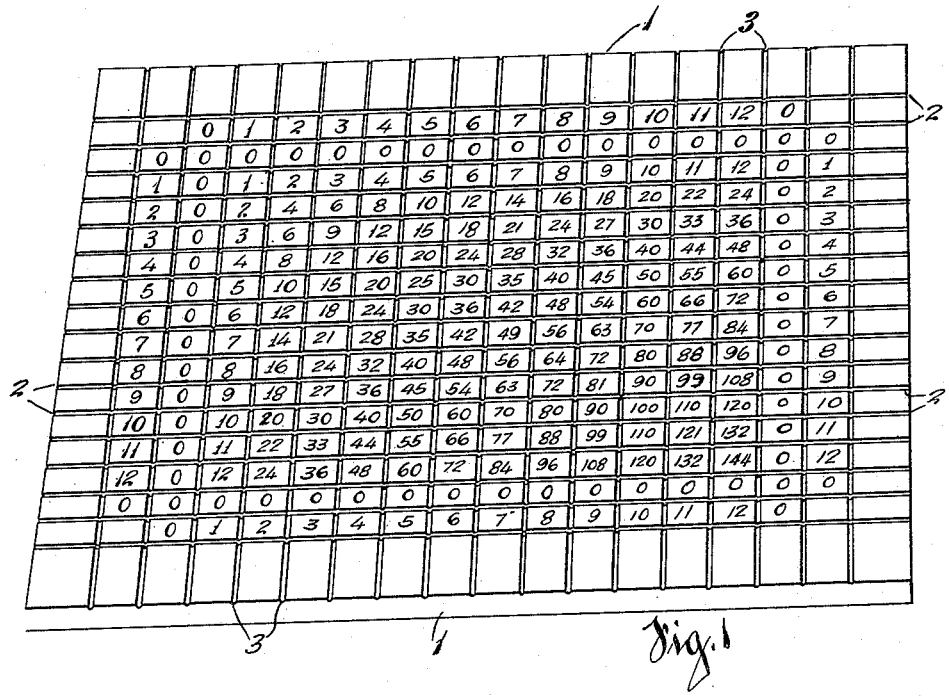
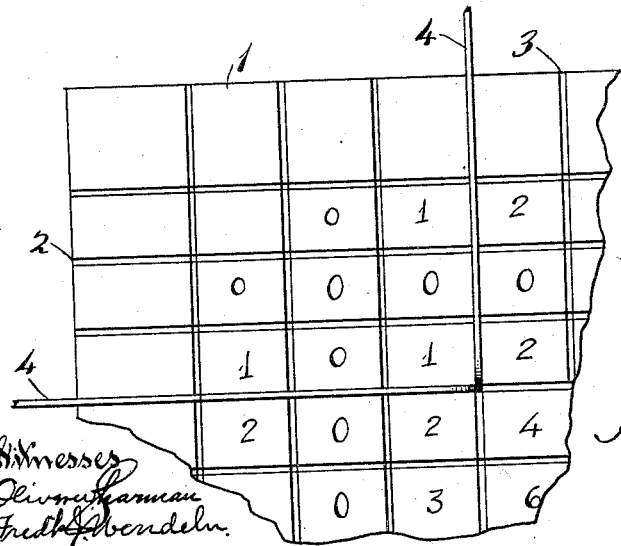
Inventor
Albertina Bechmann,
By
Arthur V. Ewald,
Attorneys

UNITED STATES PATENT OFFICE.

ALBERTINA BECHMANN, OF CINCINNATI, OHIO.

EDUCATIONAL APPLIANCE.

1,163,125.  Specification of Letters Patent.  Patented Dec. 7, 1915.

Application filed February 18, 1915. Serial No. 9,047.

*To all whom it may concern:*

Be it known that I, ALBERTINA BECHMANN, a citizen of the United States, residing in Cincinnati, in the county of Hamilton and State of Ohio, have invented certain new and useful Improvements in Educational Appliances, of which the following is a full, clear, and exact description, reference being had to the accompanying drawings, forming a part of this specification.

My invention relates to improvements in educational appliances, particularly to such as relate to the instruction of beginners in the fundamental calculations of mathematics.

The object of my invention is to provide means whereby the multiplication, division, addition and subtraction of numbers may be easily and readily learned by a child without the aid of an instructor and in a manner to impress the lessons firmly on the mind of such child.

It is a well known fact that the child mind experiences great difficulty in acquiring purely abstract truths, such as the mathematical calculations referred to, and this difficulty is frequently accompanied by, or results in, a repugnance for its cause, which, of course, greatly retards the child's mental progress. This condition, it has been found, is in most, if not in all, cases entirely overcome by giving to such calculations some concrete representation, which the untrained mind is able to grasp easily, and the child is thus led to the acquisition of such truths with a minimum of labor on its part and generally in a manner which it finds highly pleasing and entertaining, and the truths thus acquired are not soon forgotten. It is to the provision of an educational appliance having this end in view that my invention is directed.

In the drawings: Figure 1 is a perspective view of said invention; Fig. 2 is an elevation of one of the indicator sticks of which two are to be used in the operation of said invention; Fig. 3 is an enlarged plan view of a portion of said device showing the use of the indicator sticks.

The numeral 1 indicates a board of suitable size and, preferably, of rectangular shape. The said board may be of any suitable material, but I prefer to make the same of wood. The board 1 is divided, by means of horizontal grooves 2 and vertical grooves 3, into intersecting rows, comprising two hundred and fifty-six rectangular spaces, this number of spaces being exclusive of the marginal spaces between the outer grooves and the edges of the boards. Of these two hundred and fifty-six spaces all except the four corner spaces are occupied by numbers in accordance with the following plan.

Each of the outer rows of spaces, the corner spaces being unused, contains fourteen spaces, and these spaces are filled with numbers ranging from cipher, or naught, to twelve and ending with cipher, the horizontal rows reading from left to right and the vertical from top to bottom. Each of the interior rows of spaces, exclusive of the outer spaces occupied by the numbers of the outer rows, contains fourteen additional spaces; of these interior rows, the upper and lower horizontal rows, being the second horizontal rows from both the top and bottom of the board, and the two side rows, being the second vertical row from each end, are filled by series of ciphers; the third horizontal row from the top, begins with "1" and increases in arithmetical progression to "12", both inclusive; the next row from the top begins with "2" and increases in arithmetical progression to "24"; each of the remaining horizontal rows has numbers in accordance with the same plan, that is, it contains numbers arranged in increasing arithmetical progression from left to right, the first number of each row being one higher than the first number of the next row above. The spaces being thus occupied, it will be seen that there are four outer rows each reading, from left to right and from top to bottom, from cipher to twelve inclusive and ending with cipher; that these four rows are separated from the interior rows of numbers by four continuous rows of ciphers, and further that the remaining rows of interior spaces are filled with numbers arranged in increasing arithmetical progression from left to right and from top to bottom, the rows beginning with numbers from one to twelve, both inclusive.

Adapted to slide in the grooves 2 and 3 of the board 1, are indicator sticks 4, by which the child using the appliance is to find the result of a calculation as hereinafter set forth.

The use of said invention is as follows: For multiplication and division the numbers of the top, bottom and two side rows are used as multipliers, divisors and quotients, while all numbers of the interior rows, in these processes, serve as products or dividends. Assume that the product of the multiplication of "9" by "7" is desired: To find the same the child first finds in any one of the outer rows either of said factors, for instance, "9" in the left hand vertical row, the other factor, the "7", is next found in either the top or bottom horizontal row, say, for example, in the top row; the child then follows the horizontal row beginning with the "9" from left to right and the vertical row beginning with "7" until he reaches the space common to both rows at their intersection, and in this space is the product he seeks, namely "63". For dividing the process is simply reversed, that is, if it is desired to divide "63" by "9", either vertical or horizontal row beginning with "9" is followed until the dividend "63" is reached, and then the row at right angles is followed in either direction, the outer number in said row being the desired quotient. To facilitate the performance of these calculations by the child, the indicator sticks 4 are used, the same being adapted to slide along the grooves in the board and thus lead the child to the desired interior square, as clearly indicated in Fig. 3 of the drawings. By the use of said appliance the child is further, enabled to add or subtract by 1's, 2's, 3's, etc., up to 12's inclusive, by merely following the interior rows as follows: For addition from top to bottom or from left to right; for subtraction, from bottom to top or from right to left. For instance, to add, or count, by 7's begin either at the top or left interior row beginning with 7, and thence either down or toward the right, the correct results of the progressive addition of 7's being indicated in the successive spaces of each of said rows. For subtraction, the outer row at right or bottom is found, following either the horizontal or vertical row to the left or upwardly, as the case may be, the highest number in the table of which 7 is a factor is found, that being 84, thence either to the left or upwardly, the correct results of the successive subtraction of 7 being indicated in the spaces of either row. In such processes the indicator sticks 4 are also useful in enabling the child to follow the proper row.

It will be obvious that the tables as above described may be enlarged or reduced in scope without departing from my said invention.

Having thus described my invention, what I claim as new and desire to secure by Letters Patent, is:

1. An educational appliance comprising a board, said board being divided into spaces by intersecting grooves therein, numbers in said spaces arranged in tables for mathematical calculations, and indicators arranged to slide in said grooves substantially as and for the purpose set forth.

2. An educational appliance comprising a board, said board being divided into spaces in intersecting rows, and numbers in said spaces, said numbers being arranged in said spaces excepting the corner spaces so that each of the outer rows begins and ends with cipher and is separated from the interior rows by a row of ciphers, and that either of the end numbers in each horizontal row and either of the end numbers in each vertical row together with the numbers in the spaces at the intersections of such horizontal and vertical rows, will serve as the factors and result in the mathematical processes of multiplication and division.

3. An educational appliance comprising a board, said board being divided into spaces in intersecting rows by grooves in said board, numbers in said spaces, said numbers being arranged in said spaces so that either of the end numbers in each horizontal row and either of the end numbers in each vertical row together with the numbers in the spaces at the intersections of such horizontal and vertical rows, will serve as the factors and result in the mathematical processes of multiplication and division, and indicators arranged to slide in said grooves substantially as and for the purpose set forth.

ALBERTINA BECHMANN.

Witnesses:
 EUGENE ADLER,
 ELLA A. WALSH.

Copies of this patent may be obtained for five cents each, by addressing the "Commissioner of Patents, Washington, D. C."